United States Patent
Saegusa

(10) Patent No.: US 6,745,281 B1
(45) Date of Patent: Jun. 1, 2004

(54) FIBER CHANNEL CONNECTION MAGNETIC DISK DEVICE AND FIBER CHANNEL CONNECTION MAGNETIC DISK CONTROLLER

(75) Inventor: Takuya Saegusa, Tokyo (JP)

(73) Assignee: NEC Corporation, Tokyo (JP)

( * ) Notice: Subject to any disclaimer, the term of this patent is extended or adjusted under 35 U.S.C. 154(b) by 139 days.

(21) Appl. No.: 09/604,914

(22) Filed: Jun. 28, 2000

(30) Foreign Application Priority Data

Jun. 30, 1999 (JP) .......................................... 11/184493

(51) Int. Cl.7 .............................................. G06F 12/00
(52) U.S. Cl. ........................ 711/112; 711/111; 711/147; 711/152; 711/153; 711/163; 711/114; 711/100; 711/164; 709/220; 709/213; 709/215; 709/216; 709/225
(58) Field of Search ................................ 711/114, 100, 711/112, 152, 153, 163; 709/220, 225, 215, 213, 216

(56) References Cited

U.S. PATENT DOCUMENTS 5,941,947 A * 8/1999 Brown et al. ............... 709/225
6,219,753 B1 * 4/2001 Richardson .................. 711/114
6,260,120 B1 * 7/2001 Blumenau et al. .......... 707/101
6,263,445 B1 * 7/2001 Blumenau .................... 380/282
6,311,255 B1 * 10/2001 Sadana ........................ 711/152
6,421,711 B1 * 7/2002 Blumenau et al. .......... 709/213
6,425,059 B1 * 7/2002 Basham et al. ............. 711/153
6,484,173 B1 * 11/2002 O'Hare et al. ................. 707/9
6,523,096 B2 * 2/2003 Sanada et al. .............. 711/152

FOREIGN PATENT DOCUMENTS

| JP | 07-319627 | 12/1995 |
|---|---|---|
| JP | 10-269161 | 10/1998 |
| JP | 10-333839 | 12/1998 |

* cited by examiner

Primary Examiner—Matthew Kim
Assistant Examiner—Zhuo H. Li
(74) Attorney, Agent, or Firm—Foley & Lardner

(57) ABSTRACT

Fiber channel connection magnetic disk device and controller which have a plurality of fiber-channel specification supporting port controllers, comprising: a port controller for managing the relationship between an identifier allocated to each host and a logical volume accessible from the host having the identifier; and a local access right management table memory for storing the management state of a logical volume accessible from an indicated host, the port controller being capable of rejecting an access from hosts other than the indicated host.

20 Claims, 13 Drawing Sheets

FIG. 2

| ACCESS RESTRICTION OR NON-RESTRICTION FLAG 541 | |
|---|---|
| Node Name | N1 |
| Node Name | N3 |
| None | |
| ⋮ | |
| None | |
| None | |

FIG. 3

| 5021(5121, 5221, 5321) | ACCESS RESTRICTION OR NON-RESTRICTION FLAG | |
|---|---|---|
| N_Port ID H1 | Node Name N1 | VALID FLAG (ON) |
| N_Port ID H3 | Node Name N3 | VALID FLAG (ON) |
| None | None | VALID FLAG (OFF) |
| . . . . . . . | . . . . . . . | . . . . . . . |
| None | None | VALID FLAG (OFF) |
| None | None | VALID FLAG (OFF) |

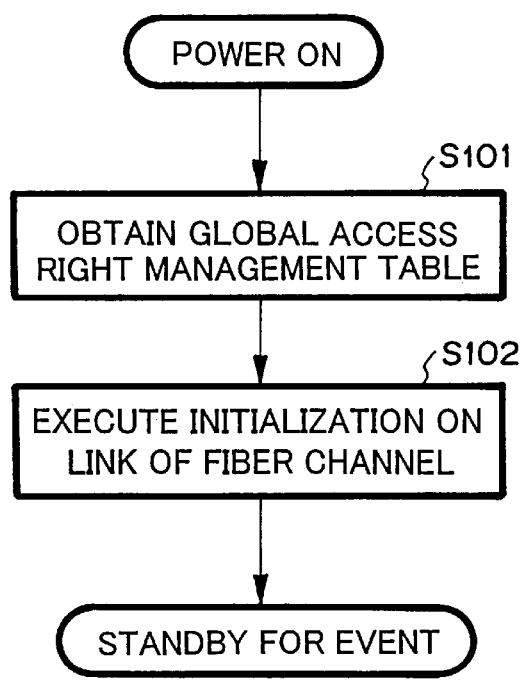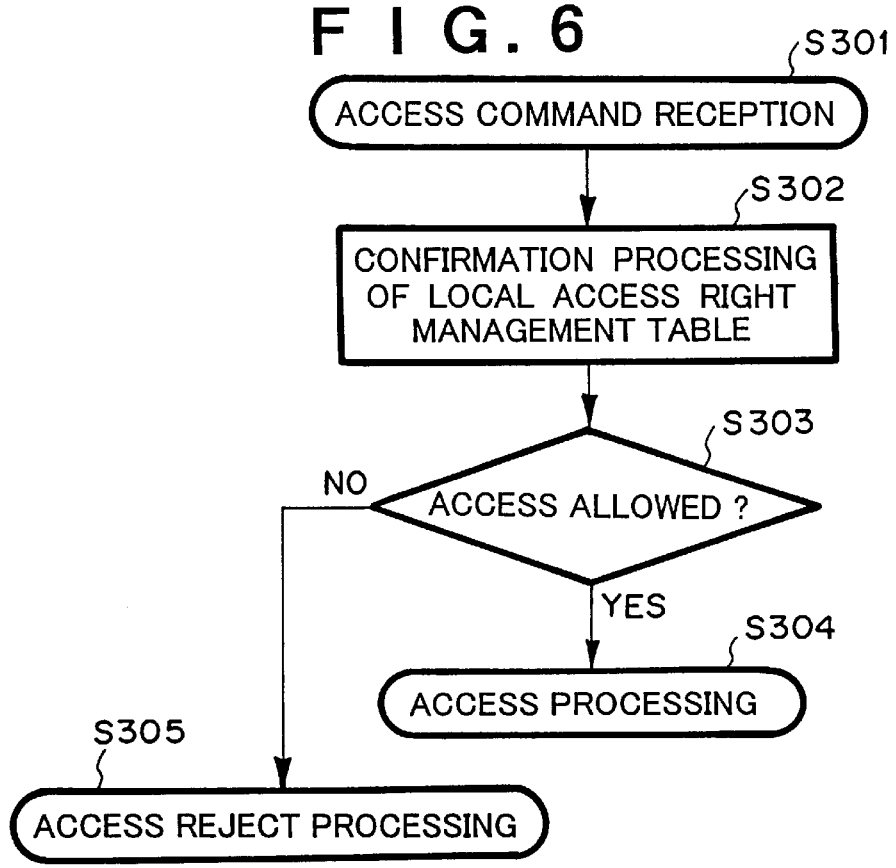

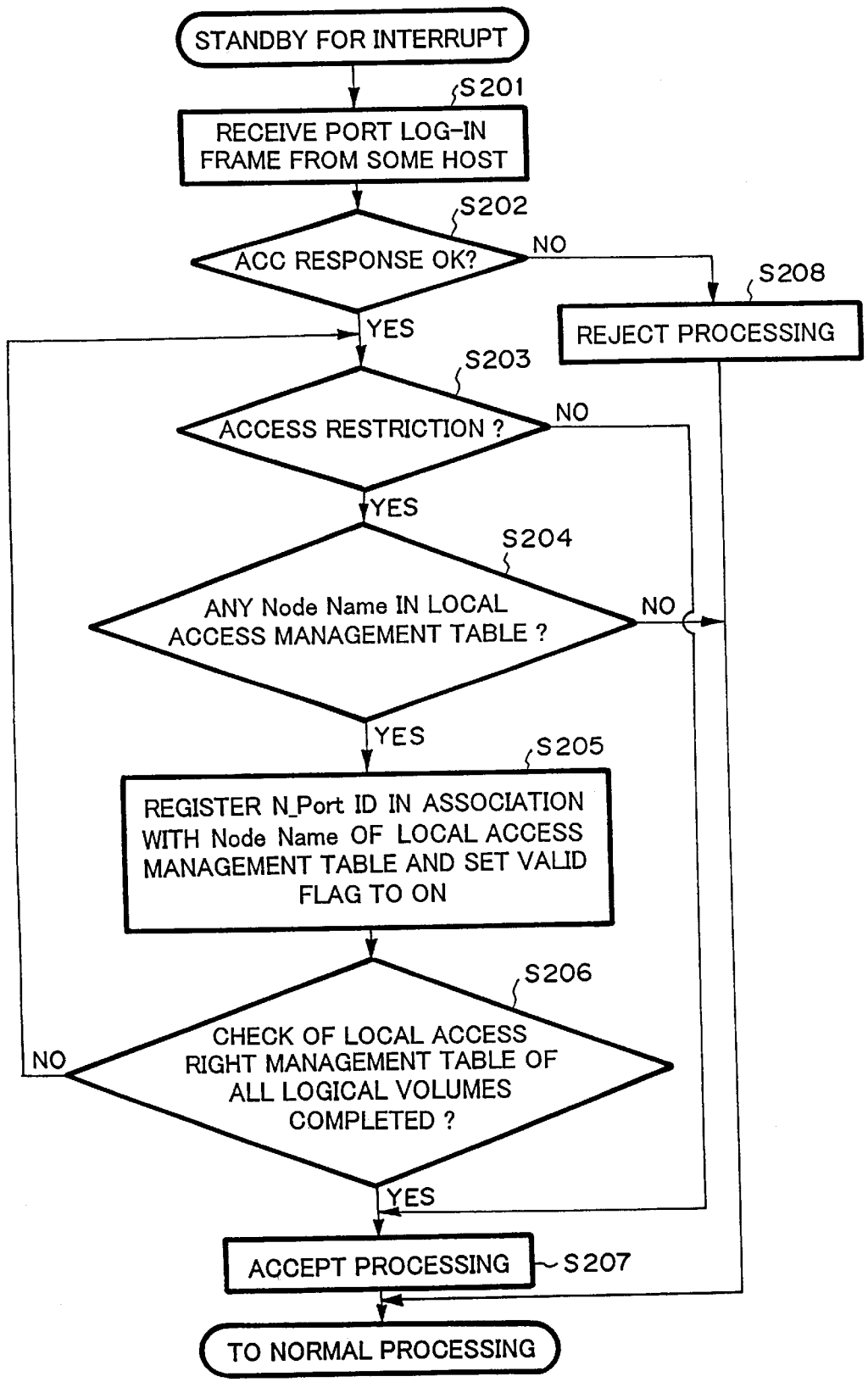

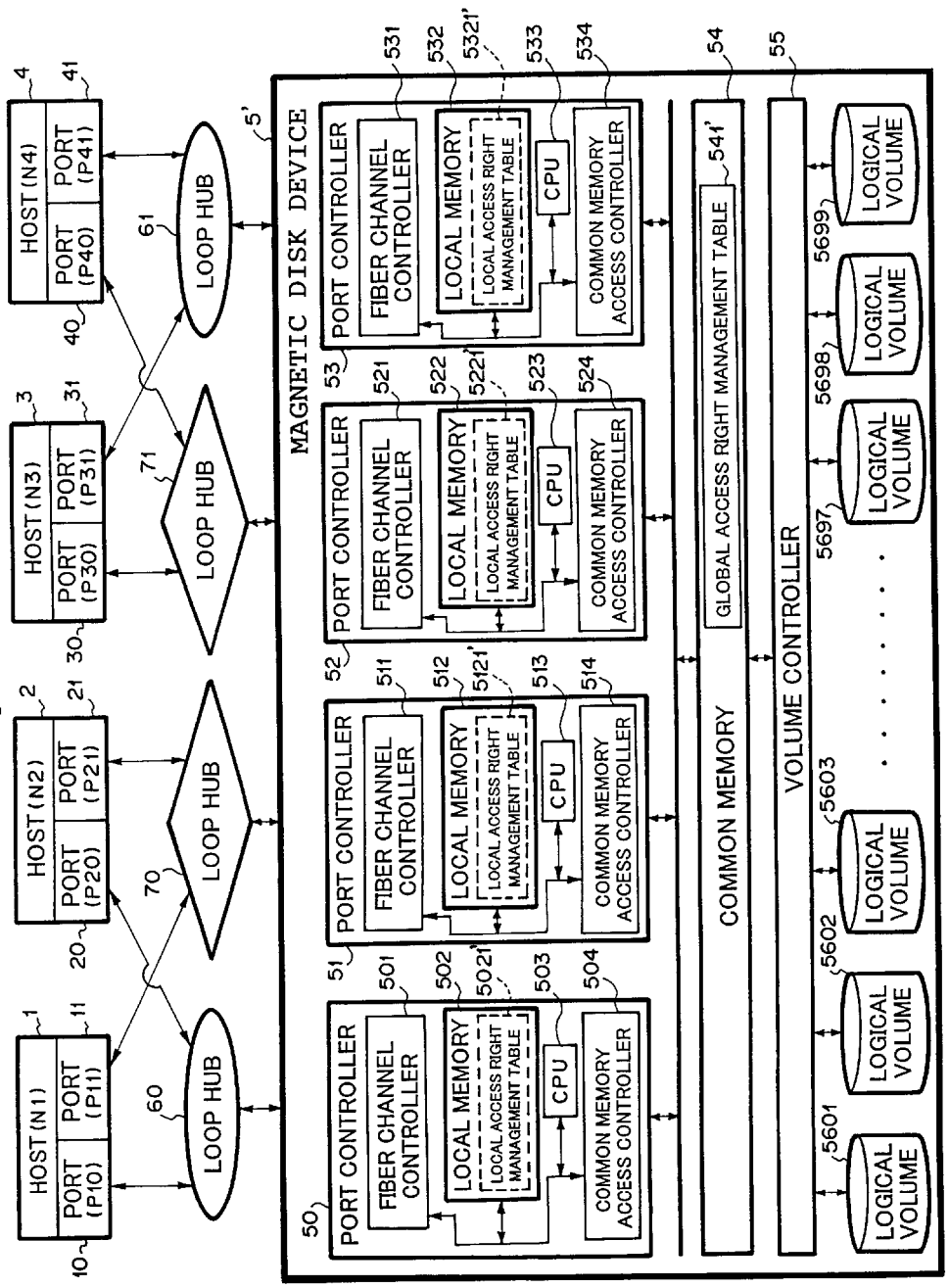

FIG. 8

| ACCESS RESTRICTION OR NON-RESTRICTION FLAG 541' |
|---|
| Port  Name  P10 |
| Port  Name  P30 |
| None |
| ⋮ |
| None |
| None |

FIG. 9

| 5021'(5121',5221',5321') | ACCESS RESTRICTION OR NON-RESTRICTION FLAG | |
|---|---|---|
| N_Port ID  H1 | Port Name  P10 | VALID FLAG (ON) |
| N_Port ID  H3 | Port Name  P30 | VALID FLAG (ON) |
| None | None | VALID FLAG (OFF) |
| ...... | ...... | ...... |
| None | None | VALID FLAG (OFF) |
| None | None | VALID FLAG (OFF) |

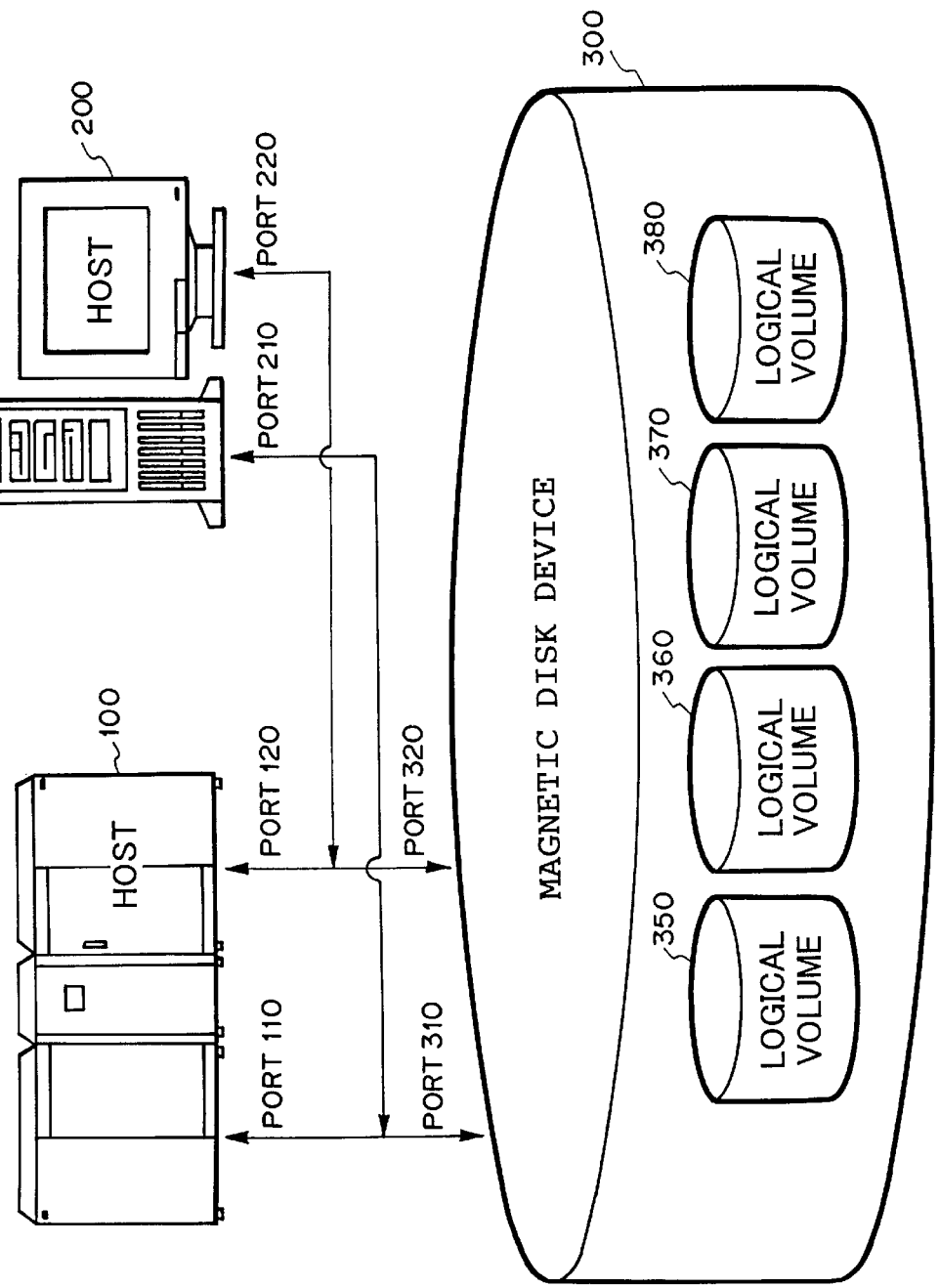

FIBER CHANNEL CONNECTION MAGNETIC DISK DEVICE AND FIBER CHANNEL CONNECTION MAGNETIC DISK CONTROLLER

BACKGROUND OF THE INVENTION

1. Field of the Invention

The present invention relates to a fiber channel connection magnetic disk device and a fiber channel connection magnetic disk controller, and particularly to a fiber channel connection magnetic disk device having a plurality of fiber-channel specification supporting port controllers and a fiber channel connection magnetic disk controller (hereinafter properly referred to as "magnetic disk device").

2. Description of the Prior Art

In a system in which a plurality of hosts are connected to a magnetic disk device through a fiber channel, the following methods have been hitherto known as a logical volume access right managing method for identifying a host and protecting an access to logical volumes in the magnetic disk device.

For example, in a connection style shown in FIG. 13, a host 100 is connected to a port 310 and a port 320 through a port 110 and a port 120 respectively, and a host 200 is connected to a port 330 and a port 340 through a port 210 and a port 220 respectively, whereby the hosts 100 and 200 are connected to a magnetic disk device 300. In such a connection style, by managing logical volumes 350, 360, 370 and 380 which can be accessed from each of the ports 310, 320, 330, 340, the access right to the logical volumes 350, 360, 370, 380 can be managed.

Further, in a connection style shown in FIG. 14, the host 100 is connected to the magnetic disk device 300 while the port 110 and the port 120 are connected to the port 310 and the port 320 respectively, and the host 200 is connected to the magnetic disk device 300 while the port 210 and the port 220 are connected to the port 310 and the port 320 respectively. Such a connection style corresponds to Arbitrated Loop topology or Fabric topology in terms of topology of fiber channels. In order to manage the logical volumes 350, 360, 370, 380: which are accessible from each of the hosts 100, 200, the method may be used an access right managing method based on a port identifier (N_Port ID) and an access right managing method based on host identification using a protocol of an upper layer.

Further, in "FIBER CHANNEL CONNECTION STORAGE CONTROLLER" disclosed in Japanese Laid-open Patent Application No. Hei-10-333839, N_Port_Name information for uniquely identifying a host device is set in a microprocessor of a storage controller before the starting of host devices. When the host devices are started and an issued frame is received by the storage controller, the microprocessor operates comparison to detect whether or not the N_Port_Name information stored in this frame is registered in an N_Port_Name list in a control table already set and held in the microprocessor, and continues a processing based on the instruction of the frame if they are coincident while rejecting the request if they are not coincident, thereby managing the access right.

However, in the above-described technique, the following problems occur when the management of the access right to the logical volume is performed.

A first problem resides in that when the magnetic disk device 300 is jointly owned by the hosts 100 and 200 in a system using a fiber channel, the management of the access right to the logical volumes 350, 360, 370, 380 is dependent on the number of ports of the magnetic disk device 300 if the connection style as shown in FIG. 13 is used. This is because the management of the accessible logical volumes 350, 360, 370, 380 is performed every the port 310, 320, 330, 340 of the magnetic disk device 300 without identifying each of the hosts 100, 200.

A second problem resides in that when the connection of the system is changed in the port-based logical volume access right management method shown in FIG. 13, the access right management of each port 310, 320, 330, 340 of the magnetic disk device 300 is required to be altered, and thus a management miss is liable to occur. This is also because the management of the accessible logical volumes 350, 360, 370, 380 is performed every the port 310, 320, 330, 340 of the magnetic disk device 300 without identifying each of the hosts 100, 200.

A third problem resides in that when the access right is managed by the port identifier (N_Port ID) in the connection style as shown in FIG. 14, the port identifier is determined through initialization processing on the basis of the specification of the fiber channel, and thus it may be varied due to extension/reduction of hosts, change of the connection of the system or the like, so that it is difficult to manage the access right on the basis of the port identifier. This is because the port identifier is dynamically varied.

A fourth problem resides in that when the host identification is executed on the basis of the protocol of the upper layer in the connection style as shown in FIG. 14, it is necessary to perform a special-purpose control operation for only the magnetic disk device 300 to be connected to an upper host. This is because the host identification is carried out by using the protocol of the upper layer.

A fifth problem resides in that it is difficult in the "fiber channel connection storage controller" disclosed in Japanese Laid-open Patent Application No. Hei-10-333839 to support the dynamical alteration of the access right due to extension/reduction of hosts, change of the connection of the system or the like. This is because the N_Port_Name information for uniquely identifying the port of the host device is required to be set in the microprocessor of the storage controller before the starting of the host devices.

In the specification of the fiber channel, the following identifies are provided as an identifier for identifying a host or port.

N_Port ID: Identifier for a port used to indicate a transmission source/transmission destination of a frame to be transmitted/received.

Node Name: Identifier given as a unique value to a node such as a host, a magnetic disk device or the like Port Name: Unique identifier for a port which is given every port of node.

N_Port ID: Identifier for identifying a port of a host determined through initialization processing of a fiber channel, and it is too unstable to surely identify the host even when the system is extended or abnormality occurs.

Therefore, the identification of hosts or ports by using Node Name/Port Name may be considered.

In the fiber channel, processing called as "port log-in" in which a port at the transmission/reception side transmits to a communication partner as a port log-in frame Node Name/Port Name which are unique values for each node/each port is indispensable in order to actually access a logical volume in a magnetic disk device. In consideration of this, if a port controller is set to register N_Port ID in a local access right management table by using a global access right management table, even when N_Port ID is afterwards varied, the host must execute the port log-in processing again, so that it is sufficient to merely re-register N_Port ID in the local access right management table by using the global access right management table managed every port at that time.

SUMMARY OF THE INVENTION

Therefore, a first object of the present invention is to provide a fiber channel connection magnetic disk device which performs management of the access right to logical volumes in the magnetic disk device by identifying a host while the host is not required to perform a control operation dependent on the number of ports of the magnetic disk device or on the magnetic disk device on the basis of the fiber channel specification.

A second object of the present invention is to provide a fiber channel connection magnetic disk device which manages the access right every logical volume, whereby the management can be continuously performed even when a connection condition is varied.

A third object of the present invention is to provide a fiber channel connection magnetic disk controller which performs management of the access right to logical volumes in the magnetic disk device by identifying a host while the host is not required to perform a control operation dependent on the number of ports of the magnetic disk device or on the magnetic disk device on the basis of the fiber channel specification.

A fourth object of the present invention is to provide a fiber channel connection magnetic disk controller which manages the access right every logical volume, whereby the management can be continuously performed even when a connection condition is varied.

A fifth object of the present invention is to provide a logical volume access right management method which performs management of the access right to logical volumes in the magnetic disk device by identifying a host while the host is not required to perform a control operation dependent on the number of ports of the magnetic disk device or on the magnetic disk device on the basis of the fiber channel specification.

A sixth object of the present invention is to provide a logical volume access right management method which manages the access right every logical volume, whereby the management can be continuously performed even when a connection condition is varied.

According to a first aspect of the present invention, there is provided a fiber channel connection magnetic disk device having a plurality of fiber-channel specification supporting port controllers, comprising: a port controller for managing the relationship between an identifier allocated to each host and a logical volume accessible from the host having the identifier; and a local access right management table memory for storing the management state of a logical volume accessible from an indicated host, said port controller being capable of rejecting an access from hosts other than the indicated host. Particularly, Node Name defined in the fiber channel specification is used as the identifier of the host.

According to a second aspect of the present invention, there is provided a fiber channel connection magnetic disk device having a plurality of fiber-channel specification supporting port controllers, which comprises: a port controller for managing the relationship between an identifier allocated to the port of each host and a logical volume accessible from the port of the host having the identifier; and a local access right management table memory for storing the management state of a logical volume accessible from the port of an indicated host, said port controller being capable of rejecting an access from the ports of hosts other than the port of the indicated host. Particularly, Port Name defined in the fiber channel specification is used as the identifier of the port of the host.

According to a third aspect of the present invention, there is provided a fiber-channel specification supporting fiber channel connection magnetic disk device, which comprises: a plurality of logical volumes; a volume controller for controlling said logical volumes; a plurality of fiber-channel specification supporting port controllers each of which comprises a fiber channel controller, a local memory, CPU and a common memory access controller; a common memory which are jointly owned by said plural port controllers; a global access right management table memory for storing into said common memory Node Name defined in the fiber channel specification as an identifier of a host having an access right every logical volume; and a local access right management table memory which is formed by obtaining Node Name from said global access right management table memory every logical volume and registering Node Name thus obtained into said local memory by each port controller when power is turned on, wherein when the same Node Name as Node Name in a port log-in frame is registered in a local access right management table memory of said port controller at the reception time of the port log-in frame, said port controller registers N_Port ID in the port log-in frame in connection with the Node Name to perform accept processing, at the reception time of an access command said port controller checks whether the same N_Port ID as N_Port ID in the access command is registered in the local access right management table memory of said port controller, and if the same N_Port ID is registered, said port controller recognizes that an access is made from the host of Node Name corresponding to N_Port ID and thus allows the access while if the same N_Port ID is not registered, said port controller rejects the access.

According to a fourth aspect of the present invention, there is provided a fiber-channel specification supporting fiber channel connection magnetic disk device, which comprises: a plurality of logical volumes; a volume controller for controlling said logical volumes; a plurality of fiber-channel specification supporting port controllers each of which comprises a fiber channel controller, a local memory, CPU and a common memory access controller; a common memory which are jointly owned by said plural port controllers; a global access right management table memory for storing into said common memory Port Name defined in the fiber channel specification as an identifier of a port of a host having an access right every logical volume; and a local access right management table memory which is formed by obtaining Port Name from said global access right management table memory every logical volume and registering Port Name thus obtained into said local memory by each port controller when power is turned on, wherein when the same Port Name as Port Name in a port log-in frame is registered in a local access right management table memory of said port controller at the reception time of the port log-in frame, said port controller registers N_Port ID in the port log-in frame in connection with the Port Name to perform accept processing, at the reception time of an access command said port controller checks whether the same N_Port ID as N_Port ID in the access command is registered in the local access right management table memory of said port controller, and if the same N_Port ID is registered, said port controller recognizes that an access is made from a port of the host of Node Name corresponding to N_Port ID and thus allows the access while if the same N_Port ID is not registered, said port controller rejects the access.

According to a fifth aspect of the present invention, there is provided a fiber channel connection magnetic disk controller having a plurality of fiber-channel specification supporting port controllers, which comprises: a port controller for managing the relationship between an identifier allocated to each host and a logical volume accessible from the host having the identifier; and a local access right management table memory for storing the management state of a logical volume accessible from an indicated host, said port controller being capable of rejecting an access from hosts other than the indicated host.

According to a sixth aspect of the present invention, there is provided a fiber channel connection magnetic disk controller having a plurality of fiber-channel specification supporting port controllers, which comprises: a port controller for managing the relationship between an identifier allocated to the port of each host and a logical volume accessible from the port of the host having the identifier; and a local access right management table memory for storing the management state of a logical volume accessible from the port of an indicated host, said port controller being capable of rejecting an access from the ports of hosts other than the port of the indicated host.

According to a seventh aspect of the present invention, there is provided a fiber-channel specification supporting fiber channel connection magnetic disk controller, which comprises: a plurality of logical volumes; a volume controller for controlling said logical volumes; a plurality of fiber-channel specification supporting port controllers each of which comprises a fiber channel controller, a local memory, CPU and a common memory access controller; a common memory which are jointly owned by said plural port controllers; a global access right management table memory for storing into said common memory Node Name defined in the fiber channel specification as an identifier of a host having an access right every logical volume; and a local access right management table memory which is formed by obtaining Node Name from said global access right management table memory every logical volume and registering Node Name thus obtained into said local memory by each port controller when power is turned on, wherein when the same Node Name as Node Name in a port log-in frame is registered in a local access right management table memory of said port controller at the reception time of the port log-in frame, said port controller registers N_Port ID in the port log-in frame in connection with the Node Name to perform accept processing, at the reception time of an access command said port controller checks whether the same N_Port ID as N_Port ID in the access command is registered in the local access right management table memory of said port controller, and if the same N_Port ID is registered, said port controller recognizes that an access is made from the host of Node Name corresponding to N_Port ID and thus allows the access while if the same N_Port ID is not registered, said port controller rejects the access.

According to an eighth aspect of the present invention, there is provided a fiber-channel specification supporting fiber channel connection magnetic disk controller, which comprises: a plurality of logical volumes; a volume controller for controlling said logical volumes; a plurality of fiber-channel specification supporting port controllers each of which comprises a fiber channel controller, a local memory, CPU and a common memory access controller; a common memory which are jointly owned by said plural port controllers; a global access right management table memory for storing into said common memory Port Name defined in the fiber channel specification as an identifier of a port of a host having an access right every logical volume; and a local access right management table memory which is formed by obtaining Port Name from said global access right management table memory every logical volume and registering Port Name thus obtained into said local memory by each port controller when power is turned on, wherein when the same Port Name as Port Name in a port log-in frame is registered in a local access right management table memory of said port controller at the reception time of the port log-in frame, said port controller registers N_Port ID in the port log-in frame in connection with the Port Name to perform accept processing, at the reception time of an access command said port controller checks whether the same N_Port ID as N_Port ID in the access command is registered in the local access right management table memory of said port controller, and if the same N_Port ID is registered, said port controller recognizes that an access is made from a port of the host of Node Name corresponding to N_Port ID and thus allows the access while if the same N_Port ID is not registered, said port controller rejects the access.

According to a ninth aspect of the present invention, there is provided a logical volume access right management method for a fiber channel connection magnetic disk device having a plurality of fiber-channel specification supporting port controllers, which is characterized by comprising the steps of: detecting an identifier of each host; managing the relationship between the identifier of each host and a logical volume accessible from the host having the identifier; and rejecting an access from hosts other than an indicated host to a logical volume accessible from the indicated host.

According to a tenth aspect of the present invention, there is provided a logical volume access right management method for a fiber channel connection magnetic disk controller having a plurality of fiber-channel'specification supporting port controllers, which is characterized by comprising the steps of: detecting an identifier of each host; managing the relationship between the identifier of each host and a logical volume accessible from the host having the identifier; and rejecting an access from hosts other than an indicated host to a logical volume accessible from the indicated host.

According to an eleventh aspect of the present invention, there is provided a logical volume access right management method for a fiber channel connection magnetic disk device having a plurality of fiber-channel specification supporting port controllers, which is characterized by comprising the steps of: obtaining Node Name from a global access right management table memory on a common memory every logical volume when power is turned on, and registering Node Name thus obtained into a local memory to thereby form a local access right management table memory; if at the reception time of a port log-in frame the same Node Name as Node Name in the port log-in frame is registered in the local access right management table memory of the self port controller, registering N_Port ID in the port log-in frame in connection with the Node Name, thereby performing accept processing; and checking at the reception time of an access command whether the same N_Port ID as N_Port ID in the access command is registered in the local access right management table memory of the self port controller, and recognizing that an access is made from a host of Node Name corresponding to N_Port ID and allowing the access if the same N_Port ID is registered while rejecting the access if the same N_Port ID is not registered.

According to a twelfth aspect of the present invention, there is provided a logical volume access right management method for a fiber channel connection magnetic disk device having a plurality of fiber-channel specification supporting port controllers, which is characterized by comprising the steps of: obtaining Port Name from a global access right management table memory on a common memory every logical volume when power is turned on, and registering Port Name thus obtained into a local memory to thereby form a local access right management table memory; if at the reception time of a port log-in frame the same Port Name as Port Name in the port log-in frame is registered in the local access right management table memory of the self port controller, registering N_Port ID in the port log-in frame in connection with the Port Name, thereby performing accept processing: and checking at the reception time of an access command whether the same N_Port ID as N_Port ID in the access command is registered in the local access right management table memory of the self port controller, and recognizing that an access is made from a port of Port Name corresponding to N_Port ID and allowing the access if the same N_Port ID is registered while rejecting the access if the same N_Port ID is not registered.

According to a thirteenth aspect of the present invention, there is provided a logical volume access right management method for a fiber channel connection magnetic disk controller having a plurality of fiber-channel specification supporting port controllers, characterized by comprising the steps of: obtaining Node Name from a global access right management table memory on a common memory every logical volume when power is turned on, and registering Node Name thus obtained into a local memory to thereby form a local access right management table memory; if at the reception time of a port log-in frame the same Node Name as Node Name in the port log-in frame is registered in the local access right management table memory of the self port controller, registering N_Port ID in the port log-in frame in connection with the Node Name, thereby performing accept processing; and checking at the reception time of an access command whether the same N_Port ID as N_Port ID in the access command is registered in the local access right management table memory of the self port controller, and recognizing that an access is made from a host of Node Name corresponding to N_Port ID and allowing the access if the same N_Port ID is registered while rejecting the access if the same N_Port ID is not registered.

According to a fourteenth aspect of the present invention, there is provided a logical volume access right management method for a fiber channel connection magnetic disk controller having a plurality of fiber-channel specification supporting port controllers, characterized by comprising the steps of: obtaining Port Name from a global access right management table memory on a common memory every logical volume when power is turned on, and registering Port Name thus obtained into a local memory to thereby form a local access!right management table memory; if at the reception time of a port log-in frame the same Port Name as Port Name in the port log-in frame is registered in the local access right management table memory of the self port controller, registering N_Port ID in the port log-in frame in connection with the Port Name, thereby performing accept processing; and checking at the reception time of an access command whether the same N_Port ID as N_Port ID in the access command is registered in the local access right management table memory of the self port controller, and recognizing that an access is made from a port of Port Name corresponding to N_Port ID and allowing the access if the same N_Port ID is registered while rejecting the access if the same N_Port ID is not registered.

According to a fifteenth aspect of the present invention, there is provided a recording medium recorded with a program which is readable by a computer and enables the computer to execute the following steps: obtaining Node Name from a global access right management table memory on a common memory every logical volume when power is turned on, and registering Node Name thus obtained into a local memory to thereby form a local access right management table memory; if at the reception time of a port log-in frame the same Node Name as Node Name in the port log-in frame is registered in the local access right management table memory of the self port controller, registering N_Port ID in the port log-in frame in connection with the Node Name, thereby performing accept processing; and checking at the reception time of an access command whether the same N_Port ID as N_Port ID in the access command is registered in the local access right management table memory of the self port controller, and recognizing that an access is made from a host of Node Name corresponding to N_Port ID and allowing the access if the same N_Port ID is registered while rejecting the access if the same N_Port ID is not registered.

According to a sixteenth aspect of the present invention, there is provided a recording medium recorded with a program which is readable by a computer and enables the computer to execute the following steps: obtaining Port Name from a global access right management table memory on a common memory every logical volume when power is turned on, and registering Port Name thus obtained into a local memory to thereby form a local access right management table memory; if at the reception time of a port log-in frame the same Port Name as Port Name in the port log-in frame is registered in the local access right management table memory of the self port controller, registering N_Port ID in the port log-in frame in connection with the Port Name, thereby performing accept processing; and checking at the reception time of an access command whether the same N_Port ID as N_Port ID in the access command is registered in the local access right management table memory of the self port controller, and recognizing that an access is made from a port of Port Name corresponding to N_Port ID and allowing the access if the same N_Port ID is registered while rejecting the access if the same N_Port ID is not registered.

BRIEF DESCRIPTION OF THE DRAWINGS

FIG. 2 is a diagram showing the content of a global access right management table memory of FIG. 1;

FIG. 3 is a diagram showing the content of a local access right management table memory of FIG. 1;

FIG. 4 is a flowchart showing the processing of a port controller of FIG. 1 when power is turned on;

FIG. 5 is a flowchart showing port log-in processing in the port controller of FIG. 1;

FIG. 6 is a flowchart showing the processing of the port controller of FIG. 1 when an access command is received;

FIG. 7 is a block diagram showing the system construction containing a fiber channel connection magnetic disk device according to a second embodiment of the present invention;

FIG. 8 is a diagram showing the content of the global access right management table memory of FIG. 7;

FIG. 9 is a diagram showing the content of the local access right management table memory of FIG. 7;

FIG. 14 is a block diagram showing another connection style of the conventional fiber channel connection magnetic disk device.

DETAILED DESCRIPTION OF THE PREFERRED EMBODIMENTS

Preferred embodiments according to the present invention will be described hereunder with reference to the accompanying drawings.

First Embodiment

Figure 1:
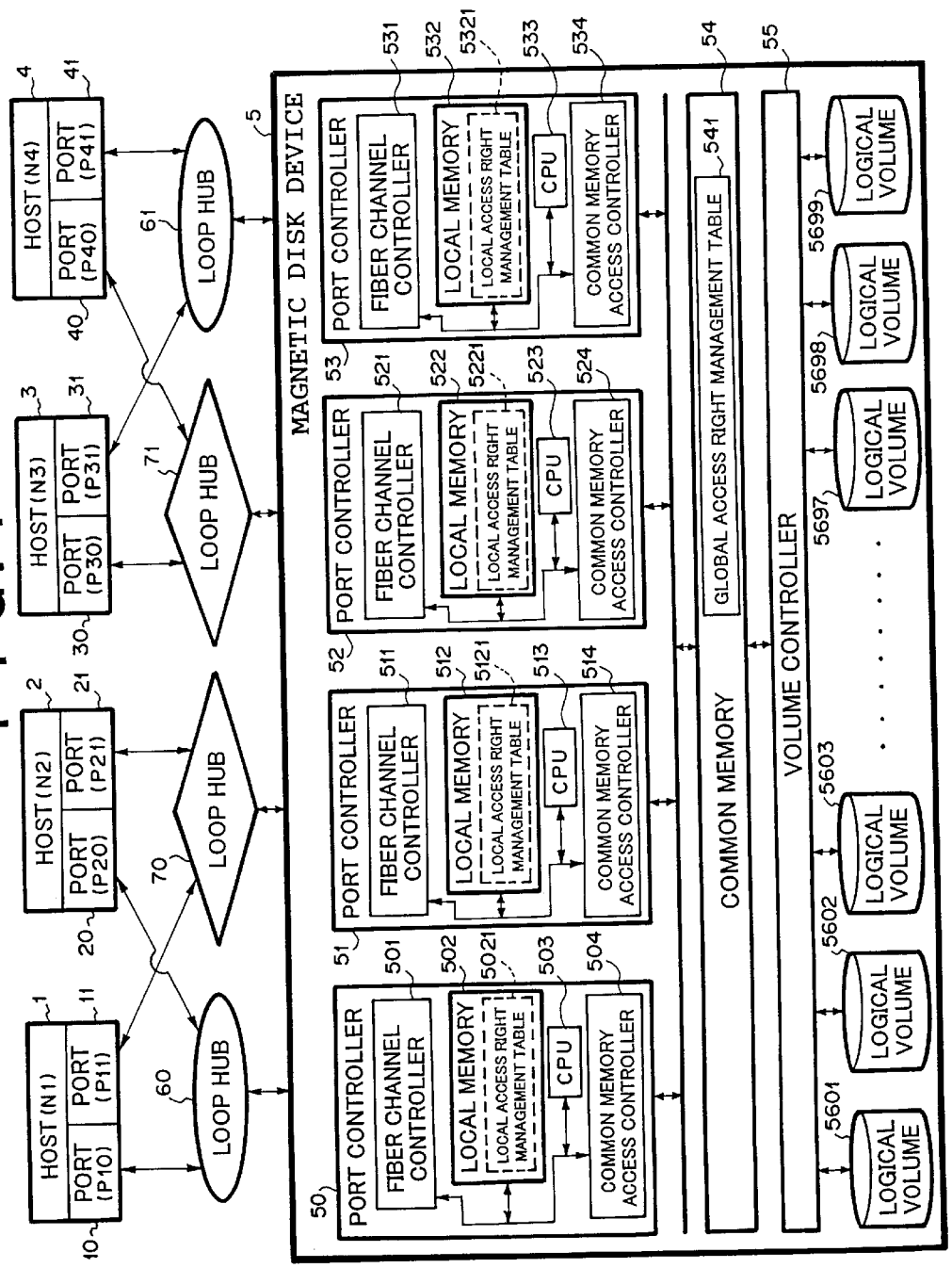
FIG. 1 is a block diagram showing the system construction containing a fiber channel connection magnetic disk device according to a first embodiment of the present invention.

FIG. 1 is a block diagram showing a system using a fiber channel connection magnetic disk device according to a first embodiment of the present invention. The system shown in FIG. 1 comprises a plurality of (four in FIG. 1) hosts 1, 2, 3, 4, a magnetic disk device 5, loop hubs 60, 61 and fabric switches 70, 71.

The host 1 has ports 10, 11, the host 2 has ports 20, 21, the host 3 has ports 30, 31 and the host 4 has ports 40, 41. The magnetic disk device 5 comprises port controllers 50, 51, 52, 53, a common memory 54, a volume controller 55 and plural logical volumes 5601 to 5699. Each of the port controllers 50, 51, 52, 53 comprises a fiber channel controller 501, 511, 521, 531, a local memory 502, 512, 522, 532, CPU (Central Processing Unit) 503, 513, 523, 533 and a common memory access controller 504 514, 524, 534, respectively.

The port 10 of the host 1 is connected through the loop hub 60 to the port controller 50, and the port 11 is connected through the fabric switch 70 to the port controller 51. The port of the host 2 is connected through the loop hub 60 to the port controller 50, and the port 21 is connected through the fabric switch 70 to the port controller 51. The port 30 of the host 3 is connected through the fabric switch 71 to the port controller 52, and the port 31 is connected through the loop hub 61 to the port controller 53. Further, the port 40 of the host 4 is connected through the fabric switch 71 to the port controller 52, and the port 41 is connected through the loop hub 61 to the port controller 53. With such a connection style, each host 1, 2, 3, 4, is designed to have a substitute pass to the magnetic disk device 5.

A local access right management table memory 5021, 5121, 5221, 5321 is provided on the local memory 502, 512, 522, 532, respectively. A global access right management table memory 541 is provided on the common memory 54.

Referring to FIG. 2, the global access right management table memory 541 stores an access restriction or non-restriction flag indicating whether an access should be restricted or not every logical volume 5601 to 5699, and Node Name having an access right every logical volume 5601 to 5699. Only one host does not necessarily have an access right to one logical volume, and the access right may be given to plural hosts. In this case, the global access right management table memory 541 stores plural Node Names. For example, in FIG. 2, only the hosts 1 and 3 are registered as hosts having the access right to the logical volume 5601.

Referring to FIG. 3, the local access right management table memory 5021, 5121, 5221, 5321 manages an access restriction or non-restriction flag for each logical volume 5601 to 5699, the relationship between Source ID in a port log-in frame (N_Port ID of a host transmitting the frame) and Node Name, and a flag indicating validity/non-validity of each N_Port ID (Valid flag). When the valid flag is on, it indicates that N_Port ID is managed, and when the valid flag is off, it indicates that N_Port I is not managed.

Referring to FIG. 4, the processing of the port controller 50, 51, 52, 53 when power is turned on comprises a step S101 for obtaining the global access right management table memory, and a fiber channel link initializing step S102.

Referring to FIG. 5, the port log-in processing of the port controller 50, 51, 52, 53 comprises a port log-in frame reception step S201, an ACC response judgment step S202, an access restriction or non-restriction judgment step S203, a Node Name presence or absence judgment step S204, an N_Port ID registering step S205, an all logical volume access right management table memory check completion judgment step S206, an accept processing step S207 and a reject processing step S208.

Referring to FIG. 6, the processing at the reception time of the access command of the port controller 50, 51, 52, 53 comprises an access command reception step S301, a local access right management table memory confirming step S302, an access allowance judging step S303, an access processing step S304, and an access rejection processing step S305.

In the fiber channel connection magnetic disk device 5 according to the first embodiment, it is assumed that each host 1,2,3,4 has Node Name N1, N2, N3, N4 respectively, and the port thereof has Port Name P10, P11, P20, P21, P30, P31, P40, P41 respectively as shown in FIG. 1. These values are unique values to each host or port, and they are unvaried through initialization of the system, etc.

Next, the operation of the fiber channel connection magnetic disk device 5 according to the first embodiment thus constructed will be described.

When power is turned on in the magnetic disk device 5, the port controller 50, 51, 52, 53 obtains the access right restriction or non-restriction flag and Node Name from the global access right management table memory 541 every logical volume 5601 to 5699, registers them onto the local memory 502, 512, 522, 532 to create the local access right management table memory 5021, 5121, 5221, 5321 (step S101), and executes the initialization on the link of the fiber channel (step S102).

Thereafter, each port controller 50, 51, 52, 53 waits for an event from the host 1,2,3,4.

Subsequently, the host 1,2,3,4 executes the port log-in processing of transmitting to a communication partner port Node Name/Port Name which are unique values to each node/each port as a port log-in frame.

When receiving a port log-in frame from a communication partner port of the host 1, 2,3,4 (step S201), each port controller 50, 51, 52, 53 transmits an accept frame for the port log-in frame to the communication partner port of the host 1,2,3,4.

Subsequently, each port controller 50, 51, 52, 53 checks the parameter, etc. in the port log-in frame to confirm whether log-in is possible or not (step S202). When ACC (ACCEPT) response is impossible, the port controller 50, 51, 52, 53 executes the reject processing (step S208).

When ACC response is possible, the port controller 50, 51, 52, 53 judges whether the access restriction or non-restriction flag registered in the local access right management table memory 5021, 5121, 5221, 5321 of the port controller 50, 51, 52, 53 indicates access restriction or access non-restriction (step S203). If the flag indicates the access non-restriction, the processing goes to the accept processing of the step S207 to allow an access to logical volumes having no access restriction at all times.

If the flag indicates the access non restriction, the port controller 50, 51, 52, 53 judges whether the same Node Name as Node Name in the port log-in frame is registered in the local access rights management table memory 5021, 5121, 5221, 5321 (step S204). If it is not registered, the processing goes to the normal processing.

If the same Node Name as Node Name in the port log-in frame is registered in the local access right management table memory 5021, 5121, 5221, 5321 of the port controller 50, 51, 52, 53, the port controller 50, 51, 52, 53 registers Source ID in the port log-in frame (N_Port ID of the port of the host transmitting the frame) into the local access right management table memory 5021, 5121, 5221, 5321 of the port controller 50, 51,52,53 in association with its Node Name, and the corresponding valid flag is set to ON (step S205).

The port controller 50, 51, 52, 53 repeats the same processing for all the logical volumes 5601 to 5699 (step S206) to manage the access right of all the logical volumes 5601 to 5699.

If the access non-restriction is judged in step S203, and if the check of the local access right management table memory 5021, 5121, 5221, 5321 to all the logical volumes 5601 to 5699 is completed in step S206, the port controller 50, 51, 52, 53 performs the accept processing (step S207), whereby the host 1,2,3,4 is allowed to access the logical volumes 5601 to 5699. That is, an issuance of the access command is allowed.

In the magnetic disk device 5, when receiving the access command to the logical volume of the host 1,2,3,4 (step S301), the port controller 50, 51, 52, 53 refers to the local access right management table memory 5021, 5121, 5221, 5321 to confirm whether the host issuing the command has an access right to a logical volume serving as an access target (step S302).

For example, taking the port controller 50 as an example, it first refers to the access restriction or non-restriction flag, and judges that the access is allowed if the access restriction or non-restriction flag indicates the access non-restriction. If the access restriction or non-restriction flag indicates the access restriction, it checks whether the same N_Port ID as N_Port ID in the access command is registered in the local access right management table memory 5021 of the port controller 50 and whether the valid flag is ON. If the same N_Port ID is registered and the valid flag is ON, the port controller recognizes that the access is an access from the host of Node Name corresponding to N_Port ID and allows the access. If the same N_Port ID is not registered or if the valid flag is OFF although the same N_Port ID is registered, the port controller rejects the access. Assuming that the host issuing the access command to the logical volume 5601 is the host 1, the host 1 has the access right to the logical volume 5601 (step S303) as shown in FIG. 3, and thus the port controller 50 performs the normal access processing (step S304). However, assuming that the host issuing the access command to the logical volume 5601 is the host 2, the host 2 has no access right to the logical volume 5601 (step S303), and thus the port controller 50 rejects the access (step S305). The same processing is carried out in the other port controllers 51, 52, 53.

When the extension/reduction of hosts is carried out on the global access right management table memory 541, in accordance with the extension/reduction, each port controller 50, 51, 52, 53 reads the global access right management table memory 541 onto the local memory 502, 512, 522, 532 again to re-create the local access right management table memory 5021, 5121, 5221, 5321, whereby the host extension/reduction can be more easily performed than the management of Port Name every port controller 50, 51, 52, 53. Further, since Node Names of the hosts 1,2,3,4 are globally managed, the connection change of the system can be easily performed by merely adding/deleting the Node Name of a host whose connection to the global access right management table memory 541 is changed.

Further, when N_Port ID of a host is changed at the working time of the extension/reduction of the host or the connection change of the system, the magnetic disk device 5 executes port log-out processing. At this time, the relationship between N_Port ID of the previously-used local access right management table memory 5021, 5121, 5221, 5321 and Node Name is invalidated by setting the valid flag to OFF, thereby enabling the continuous management.

Still further, the port controller 50, 51, 52, 53 executes the port log-in processing, whereby an access to the logical volume can be made even when the connection of the port is replaced by a substitute pass.

By managing the relationship between N_Port ID and Node Name of the host every port controller 50, 51, 52, 53 in the magnetic disk device 5, the management of the access right can be continuously performed without modification even when N_Port ID is varied.

In the case of the system construction of FIG. 1, for example, N_Port ID of the port 10, port 20 connected to the loop hub 60 are determined by the initialization processing of the fiber channel executed when the power is turned on in each device. Accordingly, the value of this N_Port ID is varied in accordance with the power-on order to the system or extension (or reduction) of ports (devices) when power is turned off, and it is unsuitable for identification of each port or host.

For example, it is not necessarily satisfied that the port of each host have the same N_Port ID between the case where after the power-on of the magnetic disk device 5, the power of the host 1 is turned on and then the power of the host 2 is turned on and between the case where the power of the host 2 is turned on before the power of the host 1 is turned on.

Likewise, with respect to the ports 11, 21, 30, 40 connected to the fabric switches 70, 71, N_Port ID is determined by the configuration of the fabric switches 70, 71 or the topology (Arbitrated Loop or Fabric topology) used between ports connected to the fabric switches 70, 71, and thus it is unsuitable for identification of each port or host.

Here, when Port Name of the ports of each host 1,2,3,4 is used for the access right management in only each port controller 50, 51, 52, 53, it may be considered that the system connection is changed due to a trouble of the loop hub 61 and the port 31 of the host 3, the port 41 of the host 4 are connected through the loop hub 60 to the magnetic disk device 5. In such a case, only Port Names of the port 10 and the port 20 are recognized as accessible ports in the port controller 50, and thus the access from the port 31 and 41 is impossible.

However, even when the system connection is required to be changed, the access right management can be continuously performed without carrying out any processing from the external, not by executing the access right management to each logical volume 5601 to 5699 every port of each host 1,2,3,4, but by executing the access right management every host, and not by executing the access right management every port controller 50, 51, 52, 53 at the magnetic disk device 5 side, but by executing the access right management every magnetic disk device 5.

In the fiber channel connection magnetic disk device 5 according to the first embodiment, the host identification is performed by using Node Name, however, the port identification of the host may be performed by using Port Name.

Second Embodiment

Next, a second embodiment of the present invention in which the identification of the port of the host is performed by using Port Name will be described with reference to the drawings.

FIG. 7 is a block diagram showing a system in which a fiber channel connection magnetic disk device 5' of a second embodiment of the present invention is disposed.

In the fiber channel connection magnetic disk device 5' of this embodiment, the global access right management table memory 541 in which Node Names are registered to identify hosts to which an access is allowed every logical volume 5601 to 5699 in the fiber channel connection magnetic disk device 5 of the first embodiment is changed to a global access right management table memory 541' in which Port Names are registered to identify ports of hosts to which an access is allowed every logical volume 5601 to 5699 as shown in FIG. 8.

Further, the local access right management table memorys 5021, 5121, 5221, 5321 in the fiber channel connection magnetic disk device 5 according to the first embodiment are changed to local access right management table memorys 5021', 5121', 5221', 5321' in which N_Port IDs are registered in association with Port Names as shown in FIG. 9.

Figure 10:
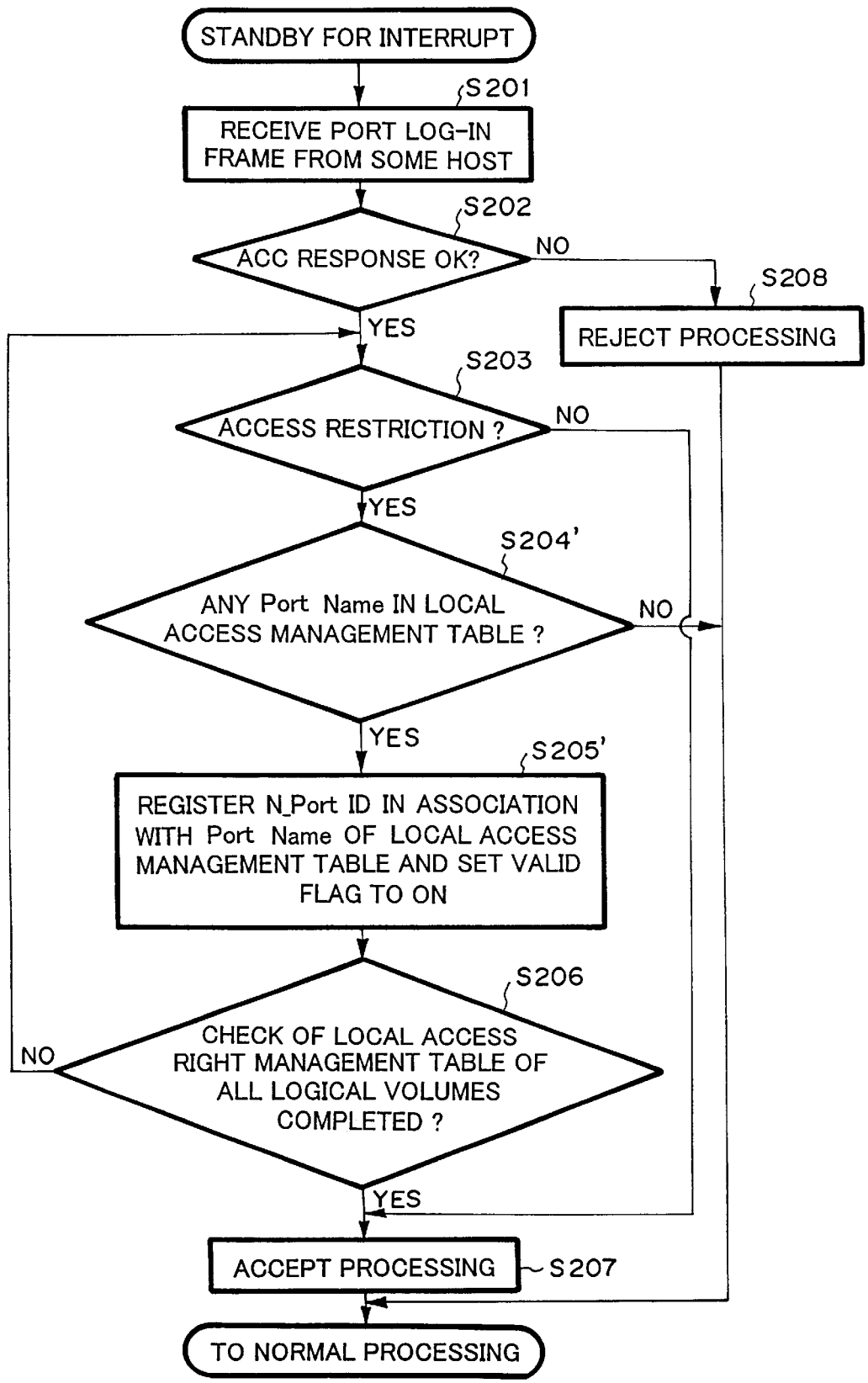
FIG. 10 is a flowchart showing port log-in processing in the port controller of FIG. 7.

Further, as shown in FIG. 10, the steps S204 and S205 in the port log-in processing of the port controllers 50, 51, 52, 53 shown in FIG. 5 are changed to steps S204' and S205' by changing Node Name to Port Name.

The other elements of the fiber channel connection magnetic disk device 5' according to the second embodiment are designed in the same construction as the corresponding elements of the fiber channel connection magnetic disk device 5 according to the first embodiment, and thus the detailed description thereof is omitted.

Next, the operation of the fiber channel connection magnetic disk device 5 of the second embodiment thus constructed will be briefly described while mainly describing the difference from the operation of the fiber channel connection magnetic disk device 5 according to the first embodiment.

When the power of the magnetic disk device 5 is turned on, the port controller 50, 51, 52, 53 obtains Port Name from the global access right management table memory 541 every logical volume 5601 to 5699 and registers it onto the local memory 502, 512, 522, 532 to create a local access right management table memory 5021', 5121', 5221', 5321' (step S101) and execute initialization on the link of the fiber channel (step S102). Thereafter, each port controller 50, 51, 52, 53 is kept on standby for an event from the host 1,2,3,4.

Subsequently, when receiving a port log-in frame from the host 1,2,3,4 (step S201), each port controller 50, 51, 52, 53 checks parameters in the port log-in frame to confirm whether log-in is possible or not (step S202). If ACC (ACCEPT) response is impossible, the port controller 50, 51, 52, 53 executes the reject processing (step S208).

If ACC response is possible, the port controller 50, 51, 52, 53 judges whether the access restriction or non-restriction flag registered in the local access right management table memory 5021, 5121, 5221, 5321 of the port controller 50, 51, 52, 53 indicates access restriction or access non-restriction (step S203). If the flag indicates the access non-restriction, an access to any logical volume having no access restriction is allowed, and thus the processing goes to the accept processing of step S207.

If the flag indicates the access restriction, the port controller 50, 51, 52, 53 judges whether the same Port Name as Port Name in the port log-in frame is registered in the local access right management table memory 5021, 5121, 5221, 5321 of the port controller 50, 51, 52, 53 (step S204'). If the same Port Name is not registered, the processing goes to the normal processing.

If the same Port Name as Port Name in the port log-in frame is registered in the local access management table memory 5021, 5121, 5221, 5321 of the port controller 50, 51, 52, 53, the port controller 50, 51, 52, 53 registers Source ID in the port log-in frame (N_Port ID of a host transmitting the frame) into the local access right management table memory 5021, 5121, 5221, 5321 of the port controller 50, 51, 52, 53 in association with the Port Name thereof, and sets the corresponding valid flag to ON (step S205').

The port controller 50, 51, 52, 53 performs the same processing on all the logical volumes 5601 to 5699 (step S206), thereby managing the access right to all the logical volumes 5601 to 5699.

If the access non-restriction is judged in step S203, and if the check of the local access right management table memory 5021, 5121, 5221, 5321 to all the logical volumes 5601 to 5699 is completed in step S206, the port controller 50, 51, 52, 53 performs the accept processing (step S207), whereby the host 1,2,3,4 is allowed to access the logical volumes 5601 to 5699. That is, the hosts are allowed to issue the access command.

According to the fiber channel connection magnetic disk device 5' of the second embodiment, the ports of the hosts are identified by using Port Name, and thus the logical volume which is accessible every port of host can be set, and thus the access right can be more finely controlled as compared with the fiber channel connection magnetic disk device 5 according to the first embodiment.

Third Embodiment

Next, a third embodiment of the present invention will be described in more detail.

Figure 11:
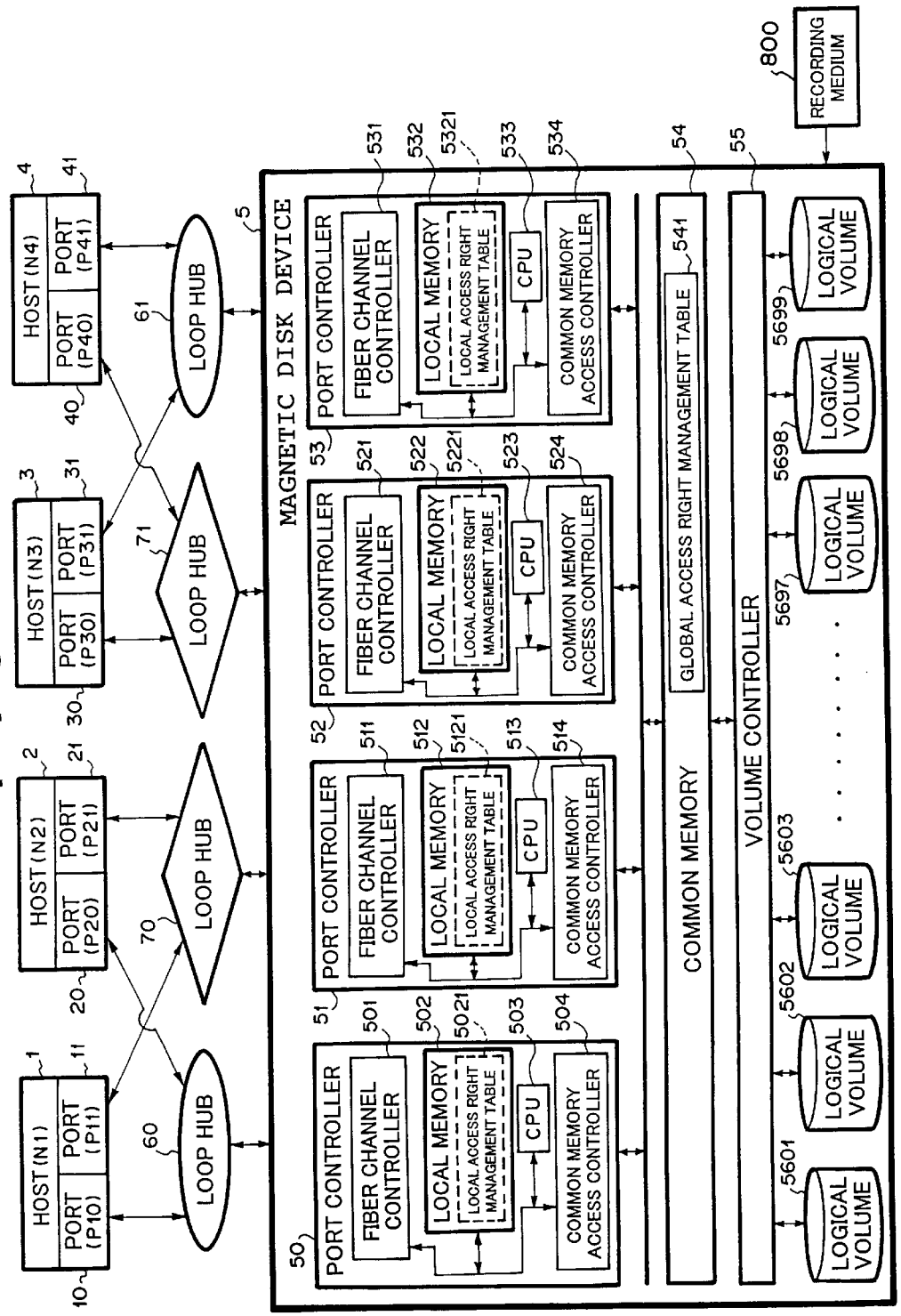
FIG. 11 is a block diagram showing the system construction containing a fiber channel connection magnetic disk device according to a third embodiment of the present invention.

Referring to FIG. 11, a fiber channel connection magnetic disk device 5 according to a third embodiment of the present invention is obtained by equipping the fiber channel connection magnetic disk device 5 of the first embodiment shown in FIG. 1 with a recording medium 800 recorded with a program which executes the processing at the power-on time shown in FIG. 4, the port log-in processing shown in FIG. 5 and the processing shown in FIG. 6 at the reception time of the access command. The recording medium 800 may be a magnetic disk, a semiconductor memory or other recording media.

The program for executing the processing at the power-on time, the port log-in processing and the processing at the reception time of the access command is read out from the recording medium 800 to the fiber channel connection magnetic disk device 5, and controls the operation of each port controller 50, 51, 52, 53 (particularly, CPU503, 513, 523, 533). The operation of each port controller 50, 51, 52, 53 under the control of the program for executing the processing at the power-on time, the port log-in processing and the processing at the reception time of the access command is the same as the operation in the fiber channel connection magnetic disk device 5, and thus the detailed description thereof is omitted.

Fourth Embodiment

Next, a fourth embodiment of the present invention will be described.

Figure 12:
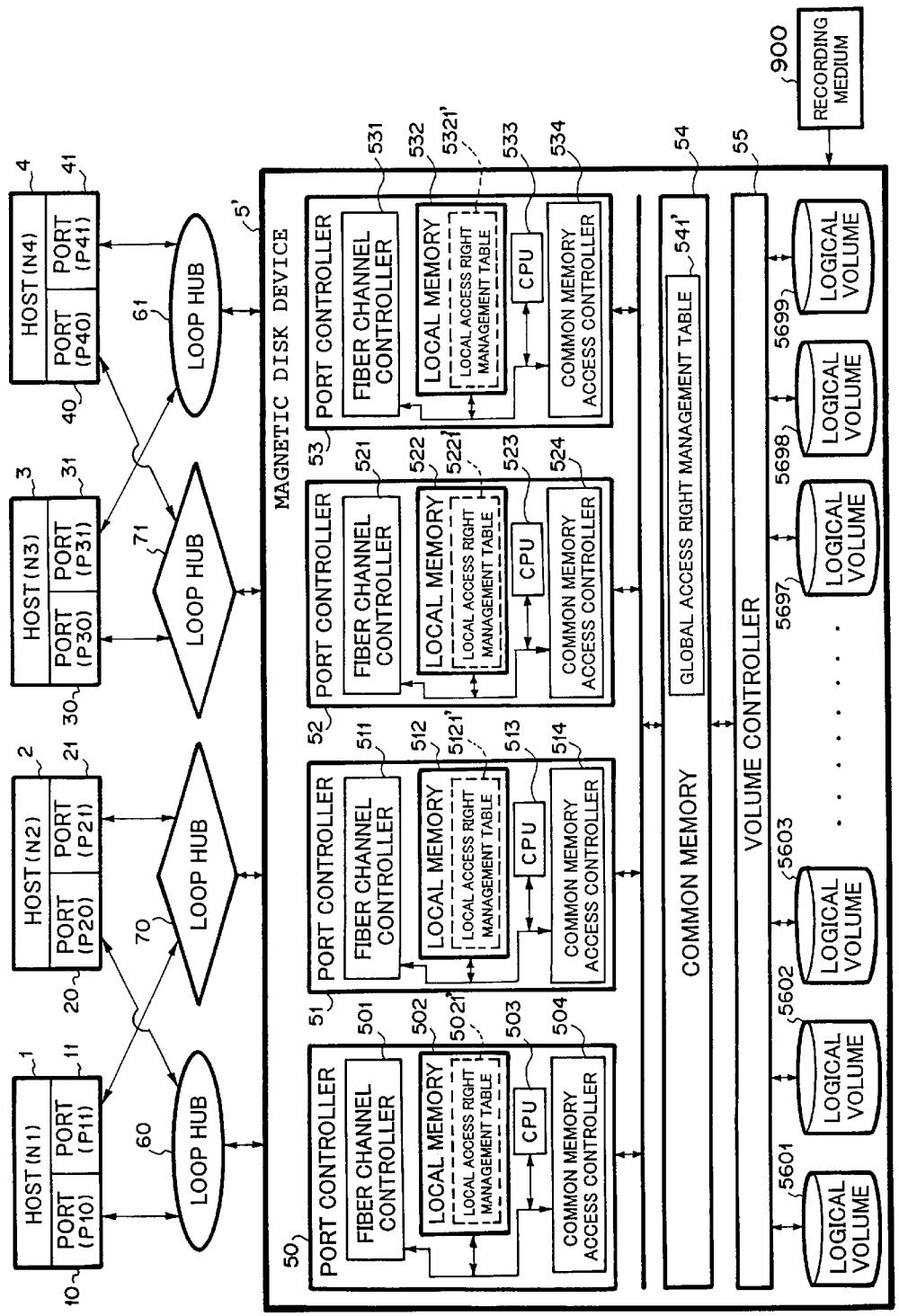
FIG. 12 is a block diagram showing the system construction containing a fiber channel connection magnetic disk device according to a fourth embodiment of the present invention.
Figure 13:
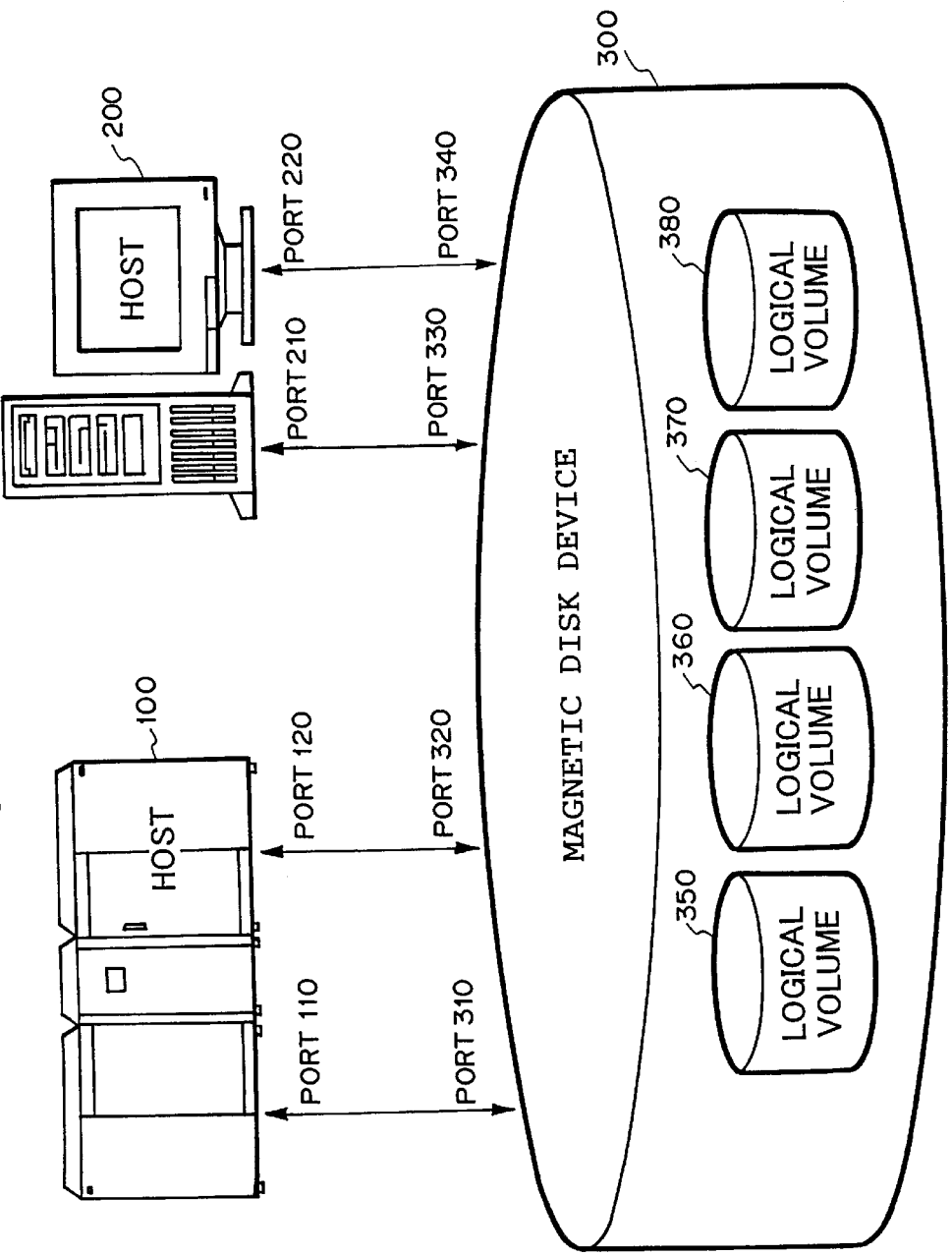
FIG. 13 is a block diagram showing a connection style of a conventional fiber channel connection magnetic disk device.

Referring to FIG. 12, a fiber channel connection magnetic disk device 5' according to the fourth embodiment of the present invention is obtained by equipping the fiber channel connection magnetic disk device 5' of the second embodiment shown in FIG. 7 with a recording medium 900 recorded with a program for executing the processing at the power-on time shown in FIG. 4, the port log-in processing shown in FIG. 10 and the processing at the reception time of the access command shown in FIG. 6. This recording medium 900 may be a magnetic disk, a semiconductor memory or other recording media.

The program for executing the processing at the power-on time, the port log-in processing and the processing at the access command reception time is read out from the recording medium 900 to the fiber channel connection magnetic disk 5', and controls the operation of each port controller 50, 51, 52, 53 (particularly, CUP 503, 513, 523, 533). The operation of each port controller 50, 51, 52, 53 under the control of the program for executing the processing at the power-on time, the port log-in processing and the processing at the access command reception time is the same as that of the fiber channel connection magnetic disk device 5' of the second embodiment, and thus the detailed description thereof is omitted.

In the above-described embodiments, the fiber channel connection magnetic disks 5,5' are designed so that the logical volumes exist in the housing of the magnetic disk device. However, the present invention may be applied to a fiber channel connection magnetic disk controller which is designed so that the logical volumes exist out of the housing of the magnetic disk device.

As described above, the present invention has the following effects.

A first effect resides in that the access right management to the logical volumes can be performed even when plural hosts are connected to ports of the magnetic disk device. This is because one or more Node Name/Port Name are stored in the global access right management table memory every port controller.

A second effect resides in that even when extension/reduction of hosts, connection change of the system or the like occurs, the access right management for the logical volumes is continued. This is because the global access right management table is referred to and the local access right management table is re-created in synchronism with the processing at the power-on time and the port log-in processing.

A third effect resides in that the access right management miss can be suppressed by the second effect.

A fourth effect resides in that a control work exclusively used for the magnetic disk device is not required to the host. This is because the management of the access right to the logical volumes can be executed in the magnetic disk device.

What is claimed is:

1. A fiber channel connection magnetic disk device having a plurality of fiber-channel specification supporting port controllers, each of said port controllers managing a respective local access right management table representing relationships between host identifiers and logical volumes accessible by hosts corresponding to said host identifiers, said local access right management table comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller, and each of said port controllers rejecting access to logical volumes from hosts other than the hosts indicated to have access to said logical volumes in the port controller's local access right management table.

2. The fiber channel connection magnetic disk device as claimed in claim 1, wherein a Node Name defined in the fiber channel specification is used as a host identifier.

3. A fiber channel connection magnetic disk device having a plurality of fiber-channel specification supporting port controllers, each of said port controllers managing a respective local access right management table representing relationships between host port identifiers and logical volumes accessible by host ports corresponding to said host port identifiers, said local access right management table comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller, and each of said port controllers rejecting access to logical volumes from host ports other than the host ports indicated to have access to said logical volumes in the port controller's local access right management table.

4. The fiber channel connection magnetic disk device as claimed in claim 3, wherein a Port Name defined in the fiber channel specification is used as a host port identifier.

5. A fiber-channel specification supporting fiber channel connection magnetic disk device, comprising:

a plurality of logical volumes;

a volume controller for controlling said logical volumes;

a plurality of fiber-channel specification supporting port controllers, each of which comprises a fiber channel controller, a local memory, a CPU and a common memory access controller;

a common memory that is jointly owned by said plurality of port controllers;

a global access right management table stored in said common memory, the global access right management table storing, for each logical volume, Node Names defined in the fiber channel specification as identifiers of hosts having an access right to said logical volume; and each port controller further comprising a local access right management table which is formed by obtaining from said global access right management table, for each logical volume, Node Names of hosts having access to each logical volume, and registering each Node Name thus obtained into said local access right management table, wherein, when a port log-in frame received by a port controller includes a Node Name contained in the local access right management table of said port controller, said port controller registers an N_Port ID of the port log-in frame as a host identifier in connection with said Node Name in said local access right management table, said local access right management table thereby comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller, and wherein, when an access command received by a port controller includes an N_Port ID that is registered as a host identifier in the local access right management table of said port controller in association with a Node Name, said port controller recognizes that said access command is received from the host corresponding to said Node Name and thus allows access, while if said N_Port ID is not registered, said port controller rejects access.

6. A fiber-channel specification supporting fiber channel connection magnetic disk device, comprising:

a plurality of logical volumes;

a volume controller for controlling said logical volumes;

a plurality of fiber-channel specification supporting port controllers, each of which comprises a fiber channel controller, a local memory, a CPU and a common memory access controller;

a common memory that is jointly owned by said plurality of port controllers;

a global access right management table stored in said common memory, the global access right management table storing, for each logical volume, Port Names defined in the fiber channel specification as identifiers of host ports having an access right to said logical volume; and each port controller further comprising a local access right management table which is formed by obtaining from said global access right management table, for each logical volume, Port Names of host ports having access to each logical volume, and registering each Port Name thus obtained into said local access right management table, wherein, when a port log-in frame received by a port controller includes a Port Name contained in the local access right management table of said port controller, said port controller registers an N_Port ID of the port log-in frame as a host identifier in connection with said Port Name in said local access right management table, said local access right management table thereby comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller, and wherein, when an access command received by a port controller includes an N_Port ID that is registered as a host identifier in the local access right management table of said port controller in association with a Port Name, said port controller recognizes that said access command is received from a host port corresponding to said Port Name and thus allows access, while if said N_Port ID is not registered, said port controller rejects access.

7. A fiber channel connection magnetic disk controller having a plurality of fiber-channel specification supporting port controllers, each of said port controllers managing a respective local access right management table representing relationships between host identifiers and logical volumes accessible by hosts corresponding to said host identifiers, said local access right management table comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller, and each of said port controllers rejecting access to logical volumes from hosts other than the hosts indicated to have access to said logical volumes in the port controller's local access right management table.

8. The fiber channel connection magnetic disk controller as claimed in claim 7, wherein a Node Name defined in the fiber channel specification is used as a host identifier.

9. A fiber channel connection magnetic disk controller having a plurality of fiber-channel specification supporting port controllers, each of said port controllers managing a respective local access right management table representing relationships between host port identifiers and logical volumes accessible by host ports corresponding to said host port identifiers, said local access right management table comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller, and each of said port controllers rejecting access to logical volumes from host ports other than the host ports indicated to have access to said logical volumes in the port controller's local access right management table.

10. The fiber channel connection magnetic disk controller as claimed in claim 9, wherein a Port Name defined in the fiber channel specification is used as a host port identifier.

11. A fiber-channel specification supporting fiber channel connection magnetic disk controller, comprising:
- a plurality of logical volumes;
- a volume controller for controlling said logical volumes;
- a plurality of fiber-channel specification supporting port controllers, each of which comprises a fiber channel controller, a local memory, a CPU and a common memory access controller;
- a common memory that is jointly owned by said plurality of port controllers;
- a global access right management table stored in said common memory, the global access right management table storing, for each logical volume, Node Names defined in the fiber channel specification as identifiers of hosts having an access right to said logical volume; and
- each port controller further comprising a local access right management table which is formed by obtaining from said global access right management table, for each logical volume, Node Names of hosts having access to each logical volume, and registering each Node Name thus obtained into said local access right management table,
- wherein, when a port log-in frame received by a port controller includes a Node Name contained in the local access right management table of said port controller, said port controller registers an N_Port ID of the port log-in frame as a host port identifier in connection with said Node Name in said local access right management table, said local access right management table thereby comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller, and
- wherein, when an access command received by a port controller includes an N_Port ID that is registered as a host port identifier in the local access right management table of said port controller in association with a Node Name, said port controller recognizes that said access command is received from the host corresponding to said Node Name and thus allows access, while if said N_Port ID is not registered, said port controller rejects access.

12. A fiber-channel specification supporting fiber channel connection magnetic disk controller, comprising:
- a plurality of logical volumes;
- a volume controller for controlling said logical volumes;
- a plurality of fiber-channel specification supporting port controllers, each of which comprises a fiber channel controller, a local memory, a CPU and a common memory access controller;
- a common memory that is jointly owned by said plurality of port controllers;
- a global access right management table stored in said common memory, the global access right management table storing, for each logical volume, Port Names defined in the fiber channel specification as identifiers of host ports having an access right to said logical volume; and
- each port controller further comprising a local access right management table which is formed by obtaining from said global access right management table, for each logical volume, Port Names of host ports having access to each logical volume, and registering each Port Name thus obtained into said local access right management table,
- wherein when a port log-in frame received by a port controller includes a Port Name contained in the local access right management table of said port controller, said port controller registers an N_Port ID of the port log-in frame as a host port identifier in connection with said Port Name in said local access right management table, said local access right management table comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller, and
- wherein, when an access command received by a port controller includes an N_Port ID that is registered as a host port identifier in the local access right management table of said port controller in association with a Port Name, said port controller recognizes that said access command is received from a host port corresponding to said Port Name and thus allows access, while if said N_Port ID is not registered, said port controller rejects access.

13. A logical volume access right management method for a fiber channel connection magnetic disk device having a plurality of fiber-channel specification supporting port controllers, comprising:
- detecting an identifier of each host coupled to the fiber channel;
- managing a relationship between the identifier of each host and logical volumes accessible by the host in a global access right management table; and
- rejecting access by a host to a logical volume in a port controller receiving an access request from said host in accordance with an access right represented in a local access right management table of said port controller, said local access right management table comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller.

14. A logical volume access right management method for a fiber channel connection magnetic disk controller having a plurality of fiber-channel specification supporting port controllers, comprising:
- detecting an identifier of each host port coupled to the fiber channel;
- managing a relationship between the identifier of each host port and logical volumes accessible by the host port in a global access right management table; and
- rejecting access by a host port to a logical volume in a port controller receiving an access request from said host port in accordance with an access right represented in a local access right management table of said port controller, said local access right management table comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller.

15. A logical volume access right management method for a port controller of a fiber channel connection magnetic disk device having a plurality of fiber-channel specification supporting port controllers, comprising:

obtaining from a global access right management table, for each logical volume of the disk device, Node Names representing hosts having access to respective logical volumes, and registering each Node Name and corresponding logical volume thus obtained into a local memory of said port controller to thereby form a local access right management table;

if a Node Name included in a port log-in frame received by the port controller is registered in the local access right management table of the port controller, registering an N_Port ID of the port log-in frame in connection with the Node Name in the local access right management table, said local access right management table thereby comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller; and if an N_Port ID included in an access command received by the port controller is registered in the local access right management table of the port controller in association with a Node Name, recognizing that said access command is received from a host corresponding to said Node Name and allowing access, and rejecting access if said N_Port ID is not registered in the local access right management table.

16. A logical volume access right management method for a port controller of a fiber channel connection magnetic disk device having a plurality of fiber-channel specification supporting port controllers, comprising:

obtaining from a global access right management table, for each logical volume of the disk device, Port Names representing host ports having access to respective logical volumes, and registering each Port Name and corresponding logical volume thus obtained into a local memory of said port controller to thereby form a local access right management table;

if a Port Name included in a port log-in frame received by the port controller is registered in the local access right management table of the port controller, registering an N_Port ID of the port log-in frame in connection with the Port Name in the local access right management table, said local access right management table thereby comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller; and if an N_Port ID included in an access command received by the port controller is registered in the local access right management table of the port controller in association with a Port Name, recognizing that said access command is received from a host port corresponding to said Port Name and allowing access, and rejecting access if said N_Port ID is not registered in the local access right management table.

17. A recording medium recorded with a program which is readable by a computer and enables the computer to execute a logical volume access right management method for a fiber channel connection magnetic disk device having a plurality of fiber-channel specification supporting port controllers, the method comprising:

detecting an identifier of each host coupled to the fiber channel;

managing a relationship between the identifier of each host and logical volumes accessible by the host having the identifier in a global access right management table; and rejecting an access from by a hosts other than an indicated host to a logical volume of a logical volume accessible from the indicated host in a port controller receiving an access request from said host in accordance with an access right represented in a local access right management table of said port controller, said local access right management table comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller.

18. A recording medium recorded with a program which is readable by a computer and enables the computer to execute a logical volume access right management method for a fiber channel connection magnetic disk controller having a plurality of fiber-channel specification supporting port controllers, the method comprising:

detecting an identifier of each host port coupled to the fiber channel;

managing a relationship between the identifier of each host port and logical volumes accessible by the host port in a global access right management table; and rejecting access by a host port to a logical volume in a port controller receiving an access request from said host port in accordance with an access right represented in a local access right management table of said port controller said local access right management table comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller.

19. A recording medium recorded with a program which is readable by a computer and enables the computer to execute the following steps:

obtaining from a global access right management table, for each logical volume of a disk device, Node Names representing hosts having access to respective logical volumes, and registering each Node Name and corresponding logical volume thus obtained into a local memory of a port controller to thereby form a local access right management table;

if a Node Name included in a port log-in frame received by the port controller is registered in the local access right management table of the port controller, registering an N_Port ID of the port log-in frame in connection with the Node Name in the local access right management table, said local access right management table thereby comprising, for each of said logical volumes, an access restriction flag indicating whether access to a corresponding logical volume is restricted, and, for each of said logical volumes to which access is restricted, a list of Node Names of hosts having access to a corresponding logical volume and a list of host identifiers corresponding to hosts in said list of Node Names that are logged into said port controller; and if an N_Port ID included in an access command received by the port controller is registered in the local access right management table of the port controller in association with a Node Name, recognizing that said access command is received from a host corresponding to said Node Name and allowing access, and rejecting access if said N_Port ID is not registered in the local access right management table.

20. A recording medium recorded with a program which is readable by a computer and enables the computer to execute the following steps:

obtaining from a global access right management table, for each logical volume of a disk device, Port Names representing host ports having access to respective logical volumes, and registering each Port Name and corresponding logical volume thus obtained into a local memory of a port controller to thereby form a local access right management table;

if a Port Name included in a port log-in frame received by the port controller is registered in the local access right management table of the port controller, registering an N_Port ID of the port log-in frame in connection with the Port Name in the local access right management table, said local access right management table thereby comprising, for each of said logical volumes, an access restriction flag indicating whether access to a corresponding logical volume is restricted, and, for each of said logical volumes to which access is restricted, a list of Port Names of host ports having access to a corresponding logical volume and a list of host port identifiers corresponding to host ports in said list of Port Names that are logged into said port controller; and if an N_Port ID included in an access command received by the port controller is registered in the local access right management table of the port controller in association with a Port Name, recognizing that said access command is received from a host port corresponding to said Port Name and allowing access, and rejecting access if said N_Port ID is not registered in the local access right management table.

* * * * *